United States Patent
Javed et al.

(12)

(10) Patent No.: US 7,788,658 B2
(45) Date of Patent: Aug. 31, 2010

(54) COMPUTER CODE PARTITIONING FOR ENHANCED PERFORMANCE

(75) Inventors: Taimur Javed, Vancouver (CA); Philip Loats, Round Rock, TX (US); William J. Tracey, II, Round Rock, TX (US); David A. Wood, III, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 1127 days.

(21) Appl. No.: 11/421,158

(22) Filed: May 31, 2006

(65) Prior Publication Data

US 2007/0283328 A1 Dec. 6, 2007

(51) Int. Cl.
*G06F 9/44* (2006.01)
*G06F 9/45* (2006.01)

(52) U.S. Cl. .................. 717/159; 717/127; 717/131; 717/153; 717/161

(58) Field of Classification Search .................. None
See application file for complete search history.

(56) References Cited

U.S. PATENT DOCUMENTS

| 6,920,460 B1 | 7/2005 | Srinivasan et al. .......... 707/102 |
| 2003/0226133 A1 | 12/2003 | Grover |

FOREIGN PATENT DOCUMENTS

WO  WO2005/041074 A1  5/2005

*Primary Examiner*—Tuan Q Dam
*Assistant Examiner*—Issac T Tecklu
(74) *Attorney, Agent, or Firm*—Ido Tuchman; Preston J. Young

(57) ABSTRACT

A method and system for enhancing the execution performance of program code. An analysis of the program code is used to generate code usage information for each code module. For each module, the code usage information is used to determine whether the code module should be separated from its original module container. If so, the code module is migrated to a new module container, and the code module in the original module container is replaced with a reference to the code module in the new module container.

1 Claim, 6 Drawing Sheets

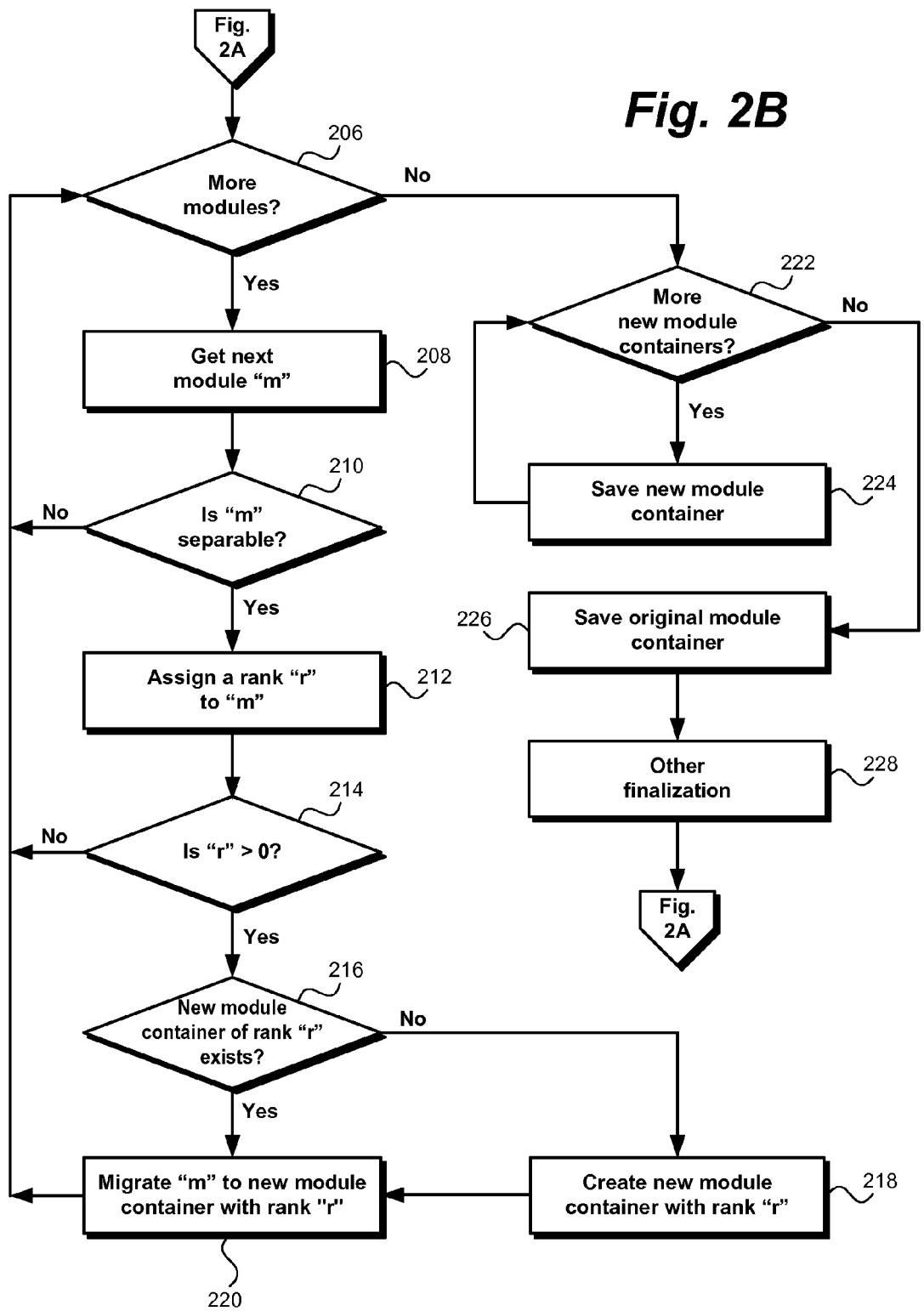

COMPUTER CODE PARTITIONING FOR ENHANCED PERFORMANCE

BACKGROUND OF THE INVENTION

The present invention relates generally to computer programs, and more specifically to enhancing the execution performance of program code by separating code modules from their original module containers into new module containers.

In many computer program products, much of the computer code is used very infrequently. In many cases, specific sections of computer code are not required at all for many usage scenarios. Loading sections of computer code that are not required for the specific usage scenario under consideration can often result in inefficient allocation of computer resources. This is the case because loading computer code utilizes processing time and memory. When a section of computer code is never used, no benefit is accrued in return for the misallocated computing resources.

Most computer languages group related computer code into discrete units. This is the case in most programming paradigms, including object-oriented programming and procedural programming. For instance, Java, an object-oriented programming language, groups related computer code into units called packages, classes and methods. Each class is assigned to a package. Each method is enclosed within a class. C, a procedural programming language, groups related computer code into units called functions. Functions are placed in files on a storage medium, with files serving as larger grouping units.

It is common practice in the art for computer code to be grouped in a manner which intuitively makes sense to humans and which facilitates human understanding of the code. This is often necessary and beneficial, because it reduces the time and resources required to develop computer code and increases the quality of the code. For example, suppose a Java programmer wishes to develop computer code to control an industrial machine which produces widgets. According to common practice in the art, the Java programmer would likely create one class to encapsulate all the computer code required to control the machine. The class would include methods which control the normal operation of the industrial process. The class would also include methods which allow reconfiguring the machine to begin producing a different model of widget. This categorization system beneficially allows any person to look at a single location, the class, to find any method related to the operation of the machine.

In many computer languages, the manner in which code is grouped determines the manner in which it is loaded and possibly whether it is loaded at all. This, in turn, impacts the performance and memory usage of the computer program product. Consider, for example, the dynamic class loading technique used by the Java platform. In this technique, a class is not loaded into memory until and unless it is invoked or otherwise referenced by other computer code within the computer program product during runtime. However, once even a single method of a class is invoked, the entire class is loaded. Dynamic class loading may reduce the time to initialize a program, because only those classes used during initialization must be loaded at that time. Moreover, when not all the code is necessary for a given runtime scenario, dynamic class loading may also improve performance and/or reduce memory usage by avoiding the loading of classes for which none of the code is needed. However, if a class includes some code which is needed and other code which is not needed, the entire class, including the unnecessary code, must be loaded. Thus, infrequently-used code may always be loaded if it is part of a class for which other computer code is usually needed. Consider, for example, the class discussed above which models the industrial machine. Because the same model of widget is normally produced for extended periods of time, the methods to reconfigure the machine are invoked only rarely. But because these methods are part of the class, they are loaded into memory even for the most common case, the case in which the machine repeatedly produces the same widget.

As this example shows, division of code based on human factors frequently fails to result in the most efficient groupings from a technical standpoint. In particular, the code groupings which seem logical to humans tend to include both frequently-used code and infrequently-used code. Therefore, loading code according to categorizations defined manually by programmers frequently results in sub-optimal performance and/or unnecessary memory usage.

Other techniques exist to improve the runtime performance of a computer program product. For example, on the Java platform, techniques exist to automatically identify blocks of bytecodes which are especially critical to performance. In these techniques, blocks thus identified are compiled to native code in advance of program execution instead of being interpreted as bytecodes during runtime.

Another technique is just-in-time (JIT) compilation, which endeavors to improve the performance of interpreted languages and bytecode-based languages such as Java. In JIT compilation, profiling is used during runtime to identify methods which are called frequently. Methods thus identified are then compiled to native code.

Unfortunately, neither technique completely resolves the unnecessary loading of code. Loading computer code not utilized can degrade performance, regardless of whether or not the unnecessary code is native to the computer hardware on which it is executing. In fact, such techniques may even worsen performance in some situations. For example, analyzing and possibly compiling the unneeded code requires computing resources, yet there is no savings in runtime because the code is never executed.

BRIEF SUMMARY OF THE INVENTION

One exemplary aspect of the present invention is a method for enhancing the execution performance of program code. The program code includes at least one original module container, and the original module container includes at least one code module. The method includes a receiving operation to receive code usage information for the code module in the original module container. The code usage information is generated from an analysis of the program code. A determining operation evaluates whether the code module in the original module container should be separated from the original module container based, at least in part, on the code usage information. A transporting operation migrates the code module to a new module container. A replacing operation replaces the code module in the original module container with a reference to the code module in the new module container.

Another exemplary aspect of the present invention is a system for enhancing the execution performance of program code. The system comprises a computer program including at least one original module container, the original module container including at least one code module. The system further comprises code usage information for the code modules in the original module containers. A program modifier is configured to automatically migrate code modules to new module containers, at least in part, based on the usage information and to replace migrated code modules in their original module containers with a reference to the same code modules in new module containers.

Yet another exemplary aspect of the invention is a computer program product embodied in a tangible media. The computer program product includes computer executable instructions configured to receive code usage information for the code module in the original module container; determine that the code module in the original module container should be separated from the original module container based, at least in part, on the code usage information; transport the code module to a new module container; and replace the code module in the original module container with a reference to the code module in the new module container.

The foregoing and other features, utilities and advantages of the invention will be apparent from the following more particular description of various embodiments of the invention as illustrated in the accompanying drawings.

BRIEF DESCRIPTION OF THE SEVERAL VIEWS OF THE DRAWINGS

FIGS. 2A and 2B show an exemplary flowchart of a process to migrate modules into new module containers contemplated by the present invention.

DETAILED DESCRIPTION OF THE INVENTION

Figure 1:
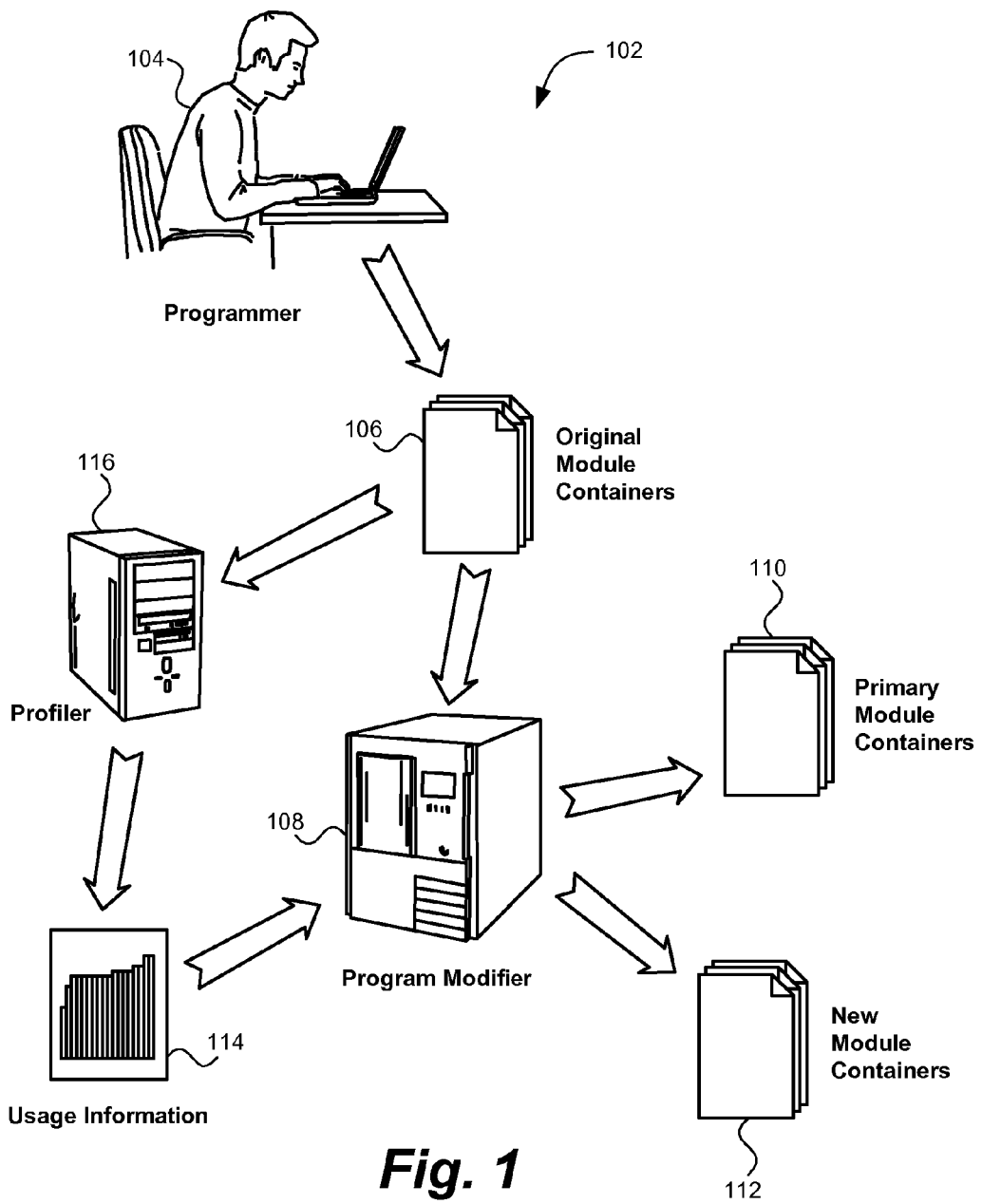
FIG. 1 shows an exemplary environment embodying the present invention.

The following description details how the present invention is employed to enhance the execution performance of program code. Throughout the description of the invention reference is made to FIGS. 1-5. When referring to the figures, like structures and elements shown throughout are indicated with like reference numerals.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 shows an exemplary environment 102 for the development of a computer program product, as contemplated by the present invention. A programmer 104 writes human-readable computer code, commonly referred to as "source code", intended to be eventually converted into a computer-executable program product or a subset thereof. This operation is similar to other software development processes known in the art which do not embody the present invention. In particular, the programmer generally does not need to adapt his or her behavior to facilitate the present invention. It is noted that the computer code may be written in any of a variety of programming languages known in the art. These programming languages may utilize any of a number of programming paradigms known in the art, including without limitation object-oriented programming and procedural programming.

While the programmer 104 may typically be a human being, it is contemplated that the computer code may be generated by a technological device, including without limitation another computer program product or a system utilizing artificial intelligence. In particular, many high-level languages are compiled by first converting code written therein to a lower-level language such as C or Java. It is contemplated that the present invention may be able to operate on code generated in this matter, thus beneficially allowing such languages to be optimized.

To clarify the following discussion, it is necessary to introduce terminology and taxonomy to be used consistently throughout this document. This taxonomy helps generalize the present invention to a variety of programming languages and environments. The term "module container" refers to a container comprising related computer code. The term "module" refers to a defined subset of a module container. In an embodiment of the present invention, a Java class constitutes a module container, and each method within such a class constitutes a module. In another embodiment of the present invention, a Java JAR (Java ARchive) file constitutes a module container, and each class within such a JAR file constitutes a module. In another embodiment of the present invention, a method or function in Java, C++ or C constitutes a module container, and each block of computer code delimited by braces within such a method or function constitutes a module. It is noted that each such embodiment may be applicable to programming languages not expressly mentioned, as many such programming languages possess features analogous to the features of Java, C and C++ listed above. Finally, it may be the case that not all module containers consistently correspond to the same element of the programming language. For example, in an embodiment of the present invention utilizing the Java programming language and environment, the original module containers may be classes, and the new module containers may be either classes or individual methods.

The programmer 104 typically separates the computer code according to the categorization system used by the underlying language. Again, this behavior is similar to that of development processes not embodying the present invention. The development process results in original module containers 106. The original module containers 106 encapsulate the modules coded by the programmer and represent the categorization system chosen by the programmer 104.

The program modifier 108 analyzes the original module containers 106 to determine how to, and whether to, migrate modules contained therein to new module containers 112. This process may attempt to achieve various goals. One contemplated goal may be to load modules into processor memory during execution according to the frequency with which they are typically invoked. For example, modules are arranged such that more frequently used modules are loaded first. Such sorting may improve a cache-hit ratio (the proportion of modules already loaded into memory to total module requests). Furthermore, such sorting increases the probability that a module which is never needed during a given run need not be loaded at all. Another goal may be to improve efficiency by loading modules in an order similar to that in which they are typically invoked. More specifically, a goal may be to decrease the time required to load the program by postponing the loading of modules not required for initialization until after the initialization phase has completed.

The output of the program modifier may consist of a revised form of the original module containers, referred to herein as primary module containers 110, plus zero or more new module containers 112. The new module containers 112 may include any modules migrated from the original module containers 106. The primary module containers 110 may include those modules from the original module containers 106 which were not migrated. Additionally, the program modifier 108 may add or change computer code in the primary module containers 110 and/or the new module containers 112. As discussed in more detail below, these changes may be needed to allow the migrated modules to work in their new containers.

In one embodiment, the program modifier 108 receives usage information 114 about the modules in the original module containers 106. The usage information 114 may be generated from at least one representative execution of the program code resulting from the module containers 106. For example, a program profiler 116 may be used to record module invocation frequency during program runtime. Other types of usage information 114 are contemplated by the invention, such as whether or not the module was invoked during program startup or initialization. In a particular embodiment of the invention, the program modifier 108 generates the usage information 114.

It is contemplated that in the output of this process, the primary module containers 110 may contain the most frequently used and/or the most essential modules of the original computer program product 106. The new module containers 112 may contain less frequently used and/or less essential elements of the original computer program product. If there is more than one new module container, the new module containers may be ranked, with successively lower ranks, for example, indicating successively more frequently used and/or more essential elements. Thus, the highest ranked new module container may be referred to as a secondary code base, the next ranked new module container as a tertiary code base, and so on.

This process may result in an optimized computer program product which can be processed and executed independently without further intervention by the present invention. In one embodiment of the invention, when the resulting computer program product is executed, only the primary module containers are initially loaded by the executing system. The secondary code base, tertiary code base, and other non-primary code bases are loaded only if and when invoked by computer code within the primary code base.

Figure 2A:
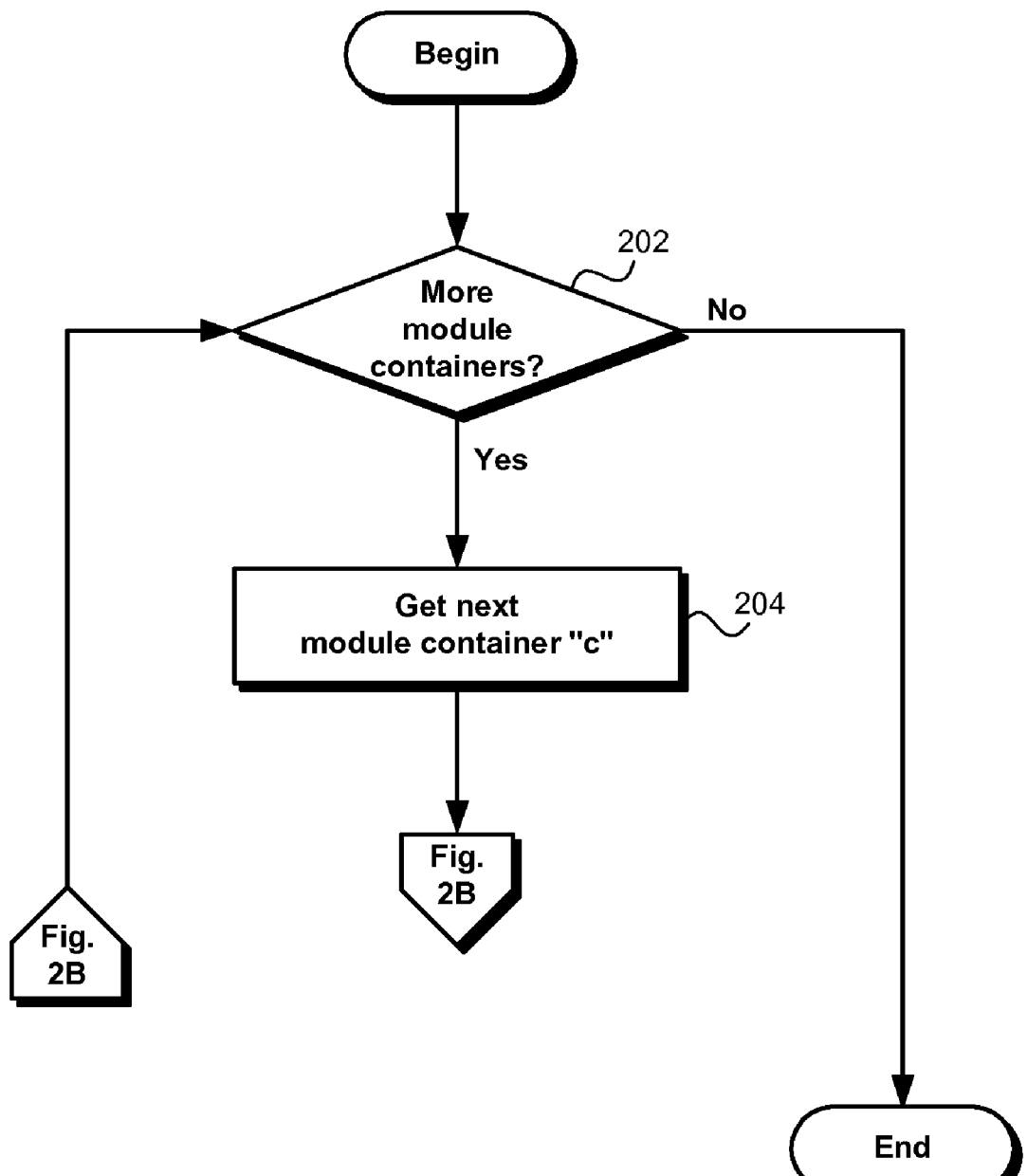

FIGS. 2A and 2B show an exemplary flowchart of operations performed by the program modifier to migrate modules into new module containers. As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Beginning on FIG. 2A, the process receives as input zero or more original module containers. At determining operation 202, the program modifier determines whether it has processed all the original module containers received. If it has, the process has finished. If it has not, processing continues with step 204.

At receiving operation 204, the program modifier receives any one of the original module containers which has not yet been processed. It is noted that the program modifier may iterate over the module containers in any order. It is contemplated that the program modifier may choose an ordering which is most appropriate for the underlying programming language. In an embodiment of the present invention, module containers may hierarchically contain other module containers, and the ordering will appropriately process each module container regardless of its depth within the hierarchy. The program modifier may perform initializing operations to prepare to process this module container. In succeeding steps, the selected module container will be referred to as "c" for brevity.

Continuing to FIG. 2B, at determining operation 206, the program modifier determines whether it has processed all the modules in the module container "c". If it has, control passes to determining operation 222 so as to complete the processing of this module container. If it has not, processing continues with receiving operation 208.

At receiving operation 208, the program modifier receives any one of the modules which has not yet been processed. It is noted that the program modifier may iterate over the modules in any order. It is contemplated that the program modifier may choose an ordering which is most appropriate for the underlying programming language. In an embodiment of the present invention, modules may hierarchically contain other modules, and the ordering will appropriately process each module regardless of its depth within the hierarchy. The program modifier may perform initializing operations to prepare to process this module. In succeeding steps, the selected module will be referred to as "m" for brevity. After receiving operation 208 is completed, control passes to determining operation 210.

At determining operation 210, the program modifier determines whether it is possible to separate the module "m" from its original module container "c". To determine the ability to separate the module, the program modifier may analyze any module and any module container, including both those in the original code base and those in the new code bases generated by the present invention. If the module cannot be separated from its original module container, control returns to receiving operation 206, where processing continues with the next module. Note that this causes the module "m" to remain inside the original module container "c".

Most object-oriented programming languages implement a technique known in the art as "data hiding." Data hiding involves restricting access to data and/or computer code located inside a class so that code located outside the class may access it either subject to restrictions or not at all. In an embodiment of the present invention, if the module "m" depends on data and/or computer code located elsewhere in the module container "c", and if that data and/or code is restricted to code located within the module container, it may be deemed infeasible to separate the module. Techniques exist in the art to circumvent data hiding restrictions. In particular, the program modifier may add elements of computer code known in the art as "mutators" and "accessors" to allow the separated modules to access hidden parts of the original module container. This is in keeping with the spirit of data hiding, because only the separated modules would be aware of any such mutators and accessors. However, these techniques may impose overhead costs in terms of processing time and/or memory usage. Thus, in a further embodiment of the present invention, the program modifier may implement these techniques, may simply deem it infeasible to separate the module, or may make this decision on a case-by-case basis.

Additionally, there may be cases in which separating the module is not strictly impossible but would impose an undesirable overhead cost in terms of computing resources. The program modifier may apply criteria to determine when such cases render it infeasible to separate the module. If it is deemed infeasible to separate the module, control reverts to receiving operation 206, just as if it were theoretically impossible. The program modifier may determine whether, for the specific implementation and programming language, the size of the computer code which must be added to the original module container to facilitate migration would actually be greater than the size of the module itself. In this case, it is contemplated that it would be deemed infeasible to migrate the module. If the module "m" depends on other parts of the original module container "c" or vice versa, the program modifier may deem it infeasible to separate the module. It is noted that a wide variety of technical and other issues known to those skilled in the art not specifically mentioned herein may interfere with separating the module.

If it is feasible to separate the module "m" from its original module container "c", processing continues with ranking operation 212, where the program modifier determines the desirability of migrating the module to a new module container. This determination may be influenced by a variety of factors, including without limitation how frequently the module is invoked, whether the module is required during the initialization of the computer program product and the amount of overhead required to migrate the module. In an embodiment of the present invention, the program modifier assigns a numeric rank to the module to quantify the desirability of migrating it. This rank will be referred to as "r" for brevity. A rank of zero may signify that it is not desirable to transport the module. A positive number may signify that it is desirable to transport the module. Successively higher numbers may indicate successively lower frequencies of usage or may otherwise denote higher degrees of desirability of migration. Ranks may be assigned as a continuous range of non-negative integers.

In an embodiment of the present invention, the original module containers are executed, or otherwise analyzed, according to one or more usage scenarios. Statistics are collected as to how frequently each module is invoked. The module "m" is assigned a rank based on the frequency of its invocation. If the module was invoked sufficiently frequently that migrating it is deemed not desirable, it may be ranked as zero. If the module was invoked sufficiently rarely that migrating it is deemed desirable, it may be ranked with a positive number. Successively lower frequencies of invocation may be denoted with successively higher ranks. Because only those modules ranked as zero are initially loaded (because only those modules are placed into the primary code base), only the most frequently used modules are loaded during the usage scenario. Less frequently used modules are loaded only if and when needed, thus beneficially improving the performance of the computer program product and/or decreasing its memory usage.

In another embodiment of the present invention, the original module containers are executed, or otherwise analyzed, to determine which modules are utilized during the initialization phase of one or more initialization scenarios. If the module "m" was used during any of the scenarios, it may be ranked as zero to indicate that migrating it is not desirable. If the module was not used during any scenario, it may be ranked as one to cause it to be moved to a new module container. Because only those modules ranked as zero are initially loaded, only those modules required during initialization are loaded during initialization, thus beneficially reducing the time required to initialize the computer program product created from the original module containers.

In another embodiment of the present invention, any logistical difficulties in migrating the module "m" are taken into account in determining its rank. For example, suppose a module is invoked somewhat infrequently. But suppose also that to migrate the module, significant additional computer code would need to be executed on every invocation. Under these assumptions, it may be beneficial to not migrate that module. Generally, the rank of the module may be reduced in proportion to the computing resources required to invoke the module if migrated to the new module container. Such computing resources may include without limitation processing time, memory and stack space. It is noted that mutator and accessor computer code added to sidestep any data or module hiding restrictions (as per the discussion in determining operation 210) will impose costs in such categories. Thus, data or module hiding restrictions may effectively reduce the rank of a module even where it is not deemed absolutely infeasible to migrate it. The degree of connectedness of the module "m" with the rest of the original module container "c" may be taken into account, with more connectedness resulting in a lower rank. The size of the module may be taken into account, with a smaller size resulting in a lower rank. This is beneficial because, for example, if migrating a module 32 bytes in size requires 24 bytes of code to be added to the original module container, performing the migration confers minimal benefits, if any.

In another embodiment of the present invention, the programmer may manually determine the rank of a module. For example, suppose a given module is invoked infrequently but is so critical when required that it should remain in the primary code base. The programmer may wish to override a high rank assignment the module would receive due to being rarely invoked, assigning it instead a rank of zero. These determinations may be effected by embedding directives into the computer program product's source code. Such directives may use language structures intended to provide meta-directives to a compiler, such as the "pragma" keyword in the C and C++ programming languages. The directives may be embedded in comments, a feature provided by most programming languages to allow adding text to source code without having that text be compiled or interpreted. The directives may be specified in a data file external to the computer program product.

At determining operation 214, the program modifier determines whether or not the rank "r" exceeded zero. If the rank was zero, control reverts to receiving operation 206, where the next module is processed. This causes the module "m" to remain inside the original module container "c", which was determined to be the most beneficial location for it. If the rank exceeded zero, processing continues with determining 216.

At determining operation 216, the program modifier determines whether a new module container with rank "r" and corresponding to the original module container "c" already exists. If no such module container exists, at creating operation 218, a new module container with rank "r" and corresponding to the original module container "c" is created.

In either case, processing continues with migrating operation 220, wherein the program modifier migrates the module "m" to the new module container with rank "r". It is emphasized that the specific steps required to effect this migrating operation are highly dependent on the underlying implementation and programming language. The migrating operation may involve identifying the specific computer code which should be separated from the original module container "c".

In one embodiment of the present invention, the module thus identified is copied into the new module container. Required parameters may be added to the module in the new module container. The module in the original module container may be replaced with computer code which invokes the corresponding module now residing in the new module container. Such computer code is sometimes referred in the art as a "stub." Other additions and/or modifications to the original module container and/or the new module container may be effected as needed to allow the migrated module to work correctly from its new location.

In another embodiment of the present invention, the module "m" is removed entirely from the original module "c". Any references to the module "m" in the old module container "c" may be replaced with references to the module in the new module container. Detailed analysis of the entire program may be necessary in order to accomplish this task.

In an embodiment of the present invention in which Java is the underlying programming language, the new module containers are implemented as inner classes and the program modifier modifies source code. In another embodiment of the present invention in which Java is the underlying programming language, the program modifier operates on Java bytecodes and emulates the creation of inner classes.

At this point, the module "m" has been completely processed, so control reverts to receiving operation 206. Recall, however, that receiving operation 206 continues with determining operation 222 if no modules remain in the original module container "c".

At determining operation 222, the program modifier determines whether it has saved all the new module containers generated in operations 206 through 220. If it has, control passes to saving operation 226. If it has not, processing continues with saving operation 224.

At saving operation 224, the program modifier selects any one of the remaining new module containers. It migrates this new module container to a code base having the same rank as the new module container. It is noted that this algorithm ensures there will be at most one new module container with a given rank associated with an original module container "c". Control then reverts to determining operation 222.

At saving operation 226, the program modifier migrates the old module container as modified by this algorithm to a new primary code base. After saving operation 226 is completed, control passes to finalizing operation 228.

At finalizing operation 228, the program modifier may perform any other steps required to finalize the processing of the original module container "c". This may include deallocating the memory containing the temporary code bases used by the algorithm, the contents of which have been permanently saved in steps 222 through 226. In Java and other programming languages where memory is freed by processes known in the art as "garbage collection", deleting may entail marking the temporary code bases as available to be removed by such garbage collection processes.

Figure 3:
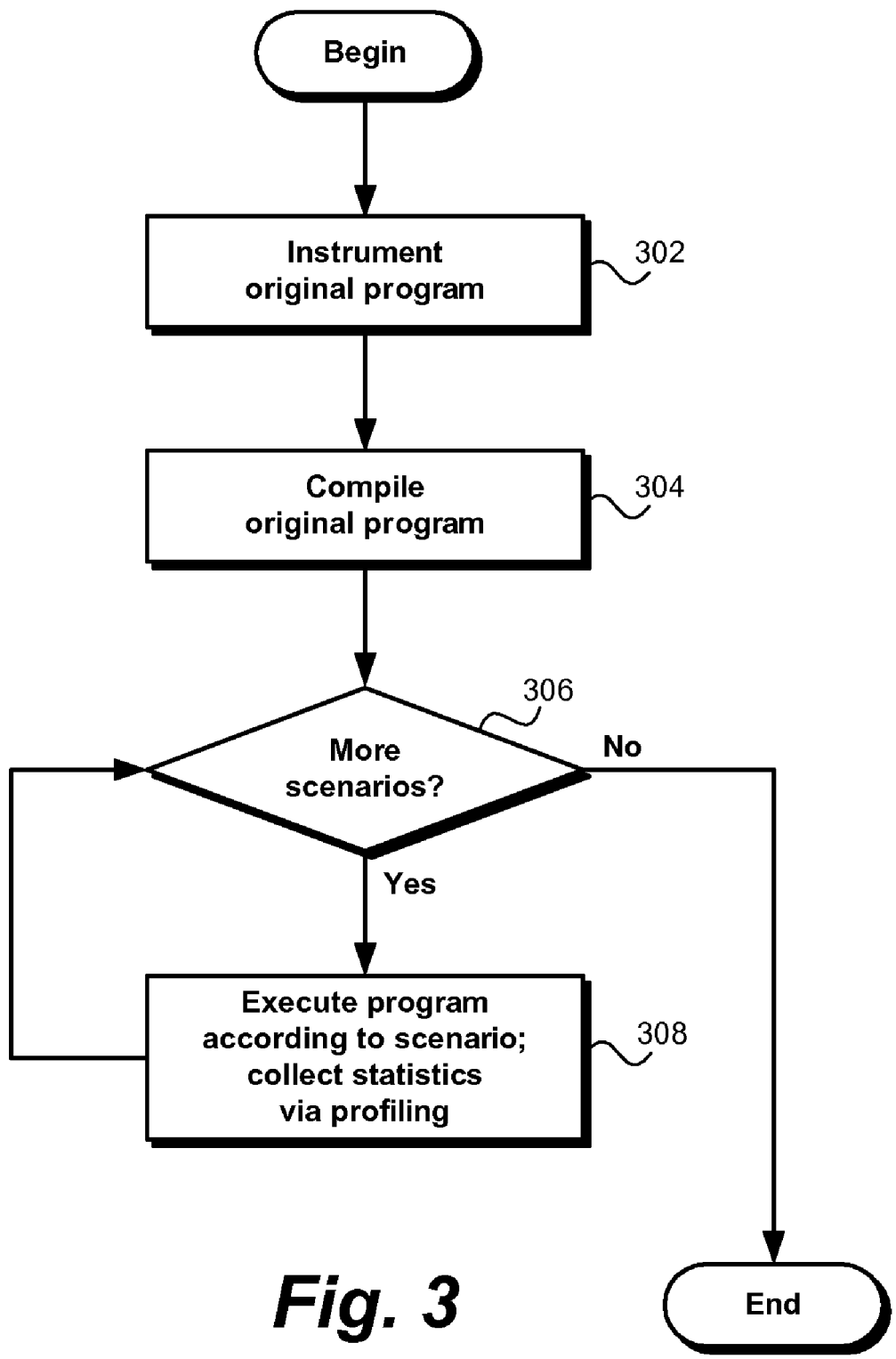
FIG. 3 shows an exemplary flowchart of a process to estimate the frequency of usage of each module in a computer program product contemplated by the present invention.

FIG. 3 shows an exemplary flowchart of a process to estimate the frequency of usage of each module in a computer program product. In this process, the computer program product may be executed under one or more usage scenarios. Data from each execution may be collected to assist in determining the most beneficial manner in which to optimize the computer program product.

At instrumenting operation 302, the computer program product may be instrumented to assist in the collection of usage statistics. Instrumentation refers to modification of a computer program product in order to facilitate profiling. Instrumentation may include adding additional computer code and/or adding directives intended for the compiler. Instrumentation may be applied to the source code, to compiled object code, or to an intermediate form such as Java bytecodes. After instrumenting operation 302 completes, control passes to compiling operation 304.

At compiling operation 304, the computer program product may be compiled or otherwise converted to a form which can be executed. It is noted that such a form may be an intermediate form, such as Java bytecodes, which can be executed in a virtual environment. It is further noted that in an interpreted language, this operation may not occur, as the source code can be executed directly. After compiling operation 304 is completed, flow continues to determining operation 306.

At determining operation 306, it is determined whether the computer program product has been executed under each of the scenarios. If so, the process is finished; the necessary data have been collected. If not, processing continues with executing operation 308.

At executing operation 308, one of the remaining scenarios is selected. It is contemplated that the scenarios will be independent of each other; in this case, the order in which the scenarios are executed will not be relevant. Generally, a scenario specifies a pattern of usage of the computer program product. Specifically, the scenario may specify a set of inputs, a set of commands, or any other parameters according to which the computer program product should be executed for testing purposes. The computer program product is thus executed according to the scenario. During execution, the computer program product is profiled. Profiling is a term used to refer to collecting data on the execution of a computer program product. The data collected through profiling may be used to generate statistics. These statistics may include the frequency of calls to each individual module, the order in which modules are called, and/or any other information which will assist in optimizing the program. After the execution according to the scenario is complete, control reverts to determining operation 306.

A scenario may focus on an expected pattern of usage during runtime. A scenario may also focus exclusively on the initialization phase of the computer program product. Initialization may be defined as the operations performed by the computer program product before it is ready to accept user input. It is noted that more than one initialization scenario may be profiled.

A variety of techniques may be used to profile the execution. In an embodiment of the present invention, the Java Virtual Machine Profiler Interface (JVMPI), a standard feature of the Java environment, is used to profile the execution. In this embodiment, Java is the underlying programming language, and a method and/or class may be equivalent to a module. The JVM generates method level execution traces which are used to calculate the number of times each module is invoked. It is noted that this embodiment may require minimal if any instrumentation, because the JVMPI can work with unmodified Java bytecodes. In another embodiment of the present invention, a profiling system such as GNU's gprof is utilized with the present invention. The coupled profiling system may collect data on the number of times each module is invoked. In another embodiment of the present invention, the programmer manually adds computer code which collects sufficient profiling data in order to generate usage statistics. In yet another embodiment of the present invention, the computer program product is statically analyzed to determine an approximate frequency with which each module is likely to be invoked under expected usage scenarios.

The usage statistics may consist of a count of the number of invocations of each method. However, this need not be the case. For example, one initialization scenario and one general scenario could be profiled, but with each module invocation during initialization being weighted five times more heavily than a module invocation after initialization has completed.

Figure 4:
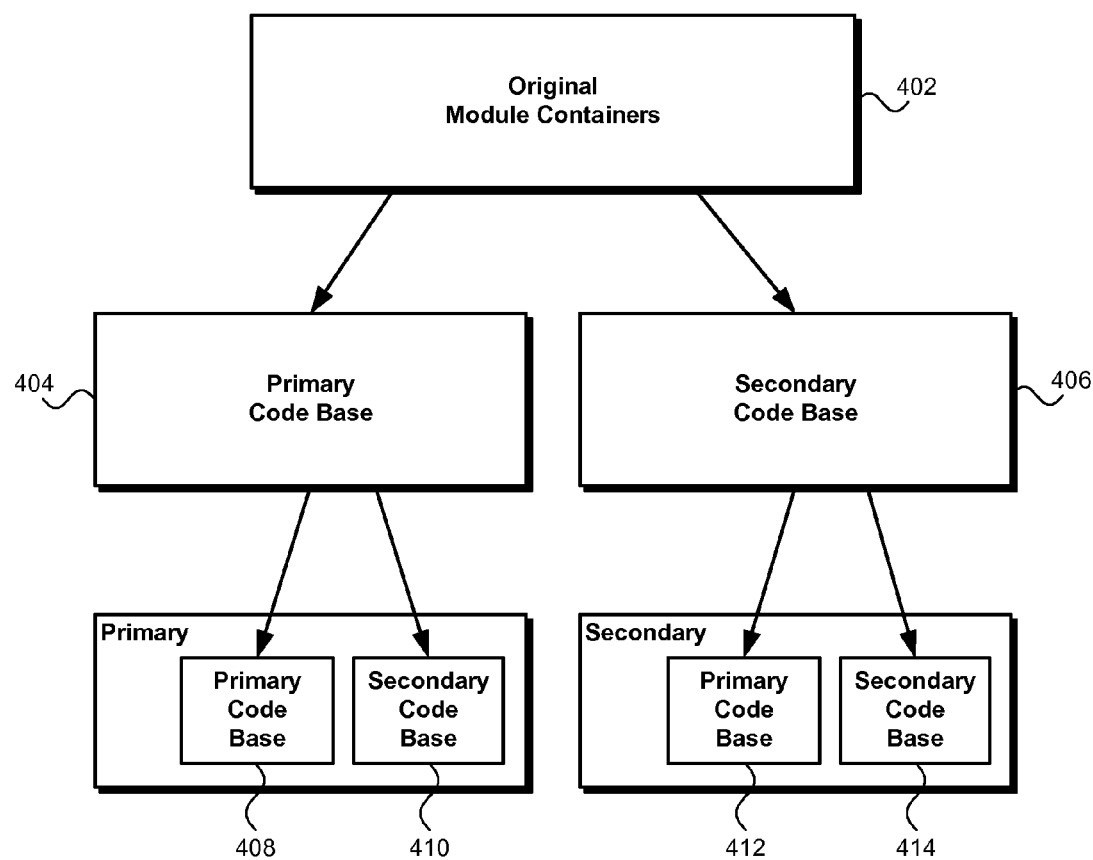
FIG. 4 demonstrates a recursive descent process contemplated by the present invention.

Turning now to FIG. 4, a method called recursive descent is demonstrated. In an embodiment of the present invention, recursive descent is used to separate the original module containers into multiple code bases. It is contemplated that program code will generally be sorted in the same order when using recursive descent as when using the method of the present invention without recursive descent. Recursive descent is particularly beneficial for sorting modules based on their order of execution.

One advantage of recursive descent is that the number of new modules referenced directly by the primary code base is minimized. This may be beneficial under many methods known in the art for linking the primary code base with the secondary code bases, as many such methods are more efficient when directly linking fewer sections of code. When using the method of the present invention without recursive descent, the primary code base refers directly to each secondary code base. Thus, the number of modules referenced directly from the primary code base is on the order of N, where N is the total number of code bases produced by the program modifier. By contrast, when using recursive descent, the primary code base at each level of recursion only refers directly to secondary code bases at the same level. As a result, the number of modules referenced directly from the primary code base is on the order of Log(N).

First, the method of the present invention is used to separate the original module containers 402 into multiple code bases. The result of this process is a primary code base 404 and a secondary code base 406.

Next, the method of the present invention is applied to each of the code bases generated at the previous level. Thus, the method operates upon the primary code base 404, further dividing it into a primary code base 408 and a secondary code base 410. The method also operates on the secondary code base 406, further dividing it into a primary code base 412 and a secondary code base 414.

Although FIG. 4 demonstrates only two levels of recursive descent, it is emphasized that this method may be applied an arbitrary number of times. For example, the method of the present invention could be applied to each of the four code bases 408, 410, 412, 414 generated in the previous step. If each code base is further divided into a primary code base and a secondary code base, a total of eight code bases would result. It is further noted that while FIG. 4 only demonstrates the division of each code base into two smaller code bases, recursive descent may also divide a code base into any number of code bases.

In an embodiment of the present invention, recursive descent may be used to separate code with successively finer granularity at each additional level of recursion. For example, the first level of recursive descent could separate Java class files (treating them as modules) from JAR files (treating them as module containers.) The second level of recursive descent could separate methods (treating them as modules) from their class files (treating them as module containers). The third level of recursive descent could separate blocks of bytecodes (treating them as modules) from their methods (treating them as module containers.)

In another embodiment of the present invention, recursive descent may be used to separate code using different criteria at each additional level of recursion. For example, the first level of recursive descent could separate modules required for initialization into a primary code base, placing all other modules into a secondary code base. The second level (and possibly succeeding levels) of recursive descent could separate modules based on their frequency of usage. An exemplary result of this process may be a code base of modules always required for initialization, a code base of modules occasionally required for initialization and multiple code bases of modules not required for initialization and arranged by decreasing frequency of usage.

Figure 5:
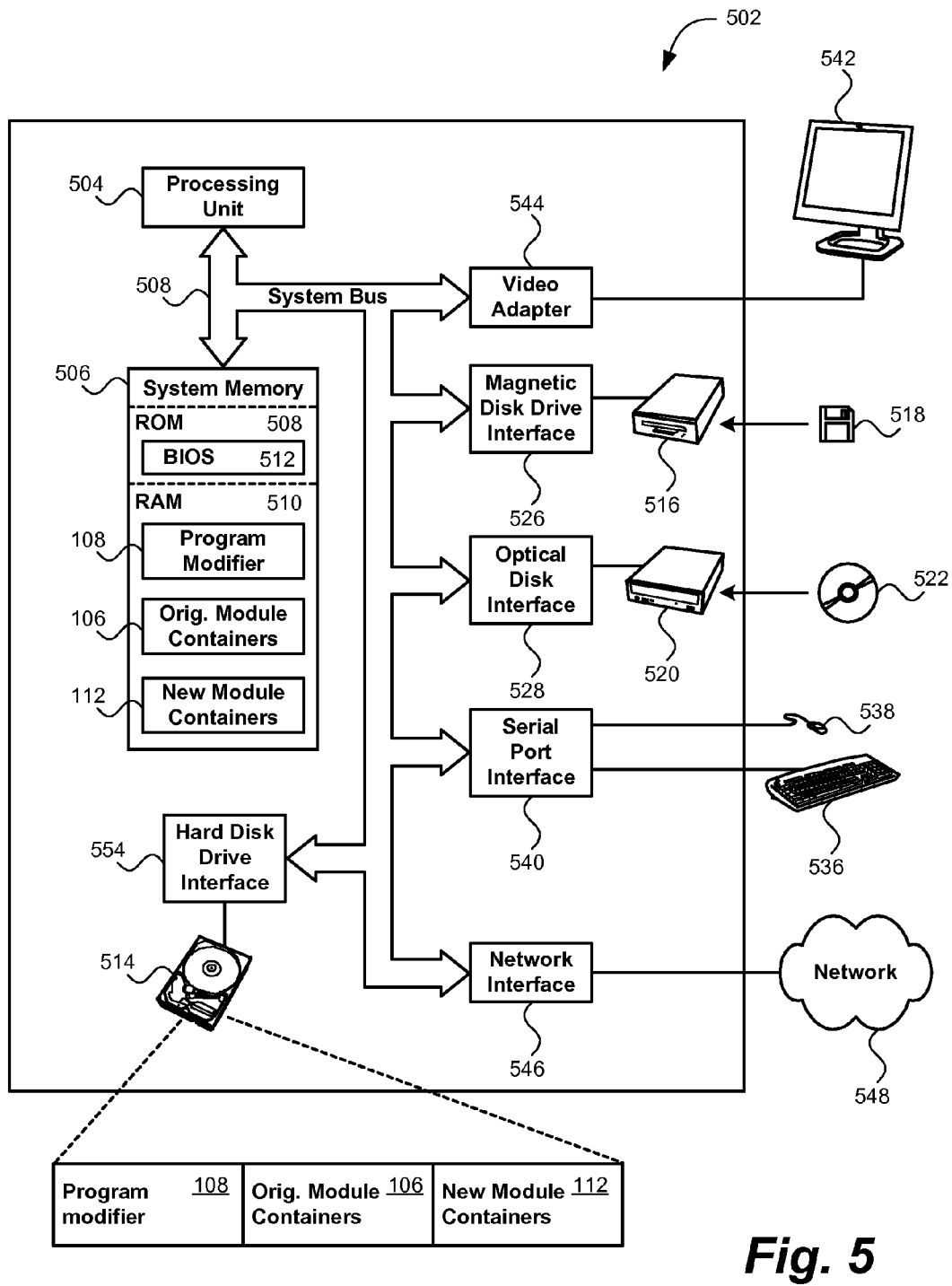
FIG. 5 shows an exemplary computer configuration embodying the present invention.

With reference to FIG. 5, an example of a computer 502 embodying the present invention is shown. One computer 502 in which the present invention is potentially useful encompasses a general-purpose computer. Examples of such computers include SPARC® systems offered by Sun Microsystems, Inc. and Pentium® based computers available from Lenovo Corp. and various other computer manufacturers. SPARC is a registered trademark of Sun Microsystems, Inc. and Pentium is a registered trademark of Intel Corporation.

The computer 502 includes a processing unit 504, a system memory 506, and a system bus 508 that couples the system memory 506 to the processing unit 504. The system memory 506 includes read only memory (ROM) 508 and random access memory (RAM) 510. A basic input/output system (BIOS) 512, containing the basic routines that help to transfer information between elements within the computer 502, such as during start-up, is stored in ROM 508.

The computer 502 further includes a hard disk drive 514, a magnetic disk drive 516 (to read from and write to a removable magnetic disk 518), and an optical disk drive 520 (for reading a CD-ROM disk 522 or to read from and write to other optical media). The hard disk drive 514, magnetic disk drive 516, and optical disk drive 520 are connected to the system bus 508 by a hard disk interface 524, a magnetic disk interface 526, and an optical disk interface 528, respectively. The drives and their associated computer-readable media provide nonvolatile storage for the computer 502. Although computer-readable media refers to a hard disk, removable magnetic media and removable optical media, it should be appreciated by those skilled in the art that other types of media that are readable by a computer, such as flash memory cards, may also be used in the illustrative computer 502.

Programs and data may be stored in the drives and RAM 510, including a program modifier 108, original module containers 106, new module containers 112, and other program modules and data (not shown). As discussed above, the program modifier 108 is configured to address limitations of the prior art by automatically separating code modules from their original module containers into new module containers based on code usage information.

A user may enter commands and information into the computer 502 through a keyboard 536 and pointing device, such as a mouse 538. Other input devices (not shown) may include a microphone, modem, joystick, game pad, satellite dish, scanner, or the like. These and other input devices are often connected to the processing unit through a serial port interface 540 that is coupled to the system bus 508.

A display device 542 is also connected to the system bus 508 via an interface, such as a video adapter 544. In addition to the display device, the computer 502 may include other peripheral output devices (not shown), such as speakers and printers.

The computer 502 operates in a networked environment using logical connections to one or more remote devices. The remote device may be a server, a router, a peer device or other common network node. When used in a networking environment, the computer 502 is typically connected to a network 548 through a network interface 546. In a network environment, program modules depicted relative to the computer 502, or portions thereof, may be stored in one or more remote memory storage devices. The network 548 may be any of various types of networks known in the art, including local area networks (LANs), wide area networks (WANs), wired and/or wireless networks. The network 548 may employ various configurations known in the art, including by example and without limitation TCP/IP, Wi-Fi®, Bluetooth® piconets, token ring, optical and microwave. Wi-Fi is a registered trademark of the Wi-Fi Alliance, located in Austin, Tex. Bluetooth is a registered trademark of Bluetooth SIG, Inc., located in Bellevue, Wash. It is noted that the present invention does not require the existence of a network.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

That which is claimed is:

1. A method for enhancing the execution performance of program code, the program code including at least one original module container, the original module container including at least one code module, wherein the code module is a class method, the method comprising:

receiving code usage information for the code module in the original module container, the code usage information generated from an analysis of the program code, the code usage information including a frequency of use of the code module and an order of use of the code module, wherein the code usage information is obtained from at least one representative execution of the program code, wherein receiving code usage information for the code module in the original module container includes performing a static analysis of the program code;

determining if the code module is separable from the original module container;

determining that the code module in the original module container should be separated from the original module container based, at least in part, on the code usage information;

assigning a rank to the code module based on the usage information;

transporting the code module to a new module container, wherein the new module container is a class containing the class method, the new module container including other code modules with the same assigned rank as the code module;

replacing the code module in the original module container with a reference to the code module in the new module container; and recursively descending through the program code and separating module containers into multiple code bases.

* * * * *